E4819 OR 3,148,245

SEARCH ROOM

Sept. 8, 1964 C. H. CURREY ETAL 3,148,245

SYSTEM FOR DETERMINING THE LISTENING HABITS OF WAVE SIGNAL RECEIVER USERS

Filed Dec. 22, 1958 4 Sheets-Sheet 1

INVENTORS:
CHARLES H. CURREY
ROBERT L. FREEMAN
DARREL W. HOLBROOK
GORDON K. TRUESDALE

BY Mason, Kolehmainen, Rathburn & Wyss
Attys.

Sept. 8, 1964 C. H. CURREY ETAL 3,148,245

SYSTEM FOR DETERMINING THE LISTENING HABITS OF WAVE SIGNAL RECEIVER USERS

Filed Dec. 22, 1958 4 Sheets-Sheet 2

Sept. 8, 1964 C. H. CURREY ETAL 3,148,245

SYSTEM FOR DETERMINING THE LISTENING HABITS OF WAVE SIGNAL RECEIVER USERS

Filed Dec. 22, 1958 4 Sheets-Sheet 4

United States Patent Office
3,148,245
Patented Sept. 8, 1964

3,148,245

SYSTEM FOR DETERMINING THE LISTENING HABITS OF WAVE SIGNAL RECEIVER USERS

Charles H. Currey, Palatine, Robert L. Freeman and Darrel W. Holbrook, Glenview, and Gordon K. Truesdale, Morton Grove, Ill., assignors to A. C. Nielsen Company, Chicago, Ill., a corporation of Delaware Filed Dec. 22, 1958, Ser. No. 782,059
8 Claims. (Cl. 179—2)

Figure 1A:
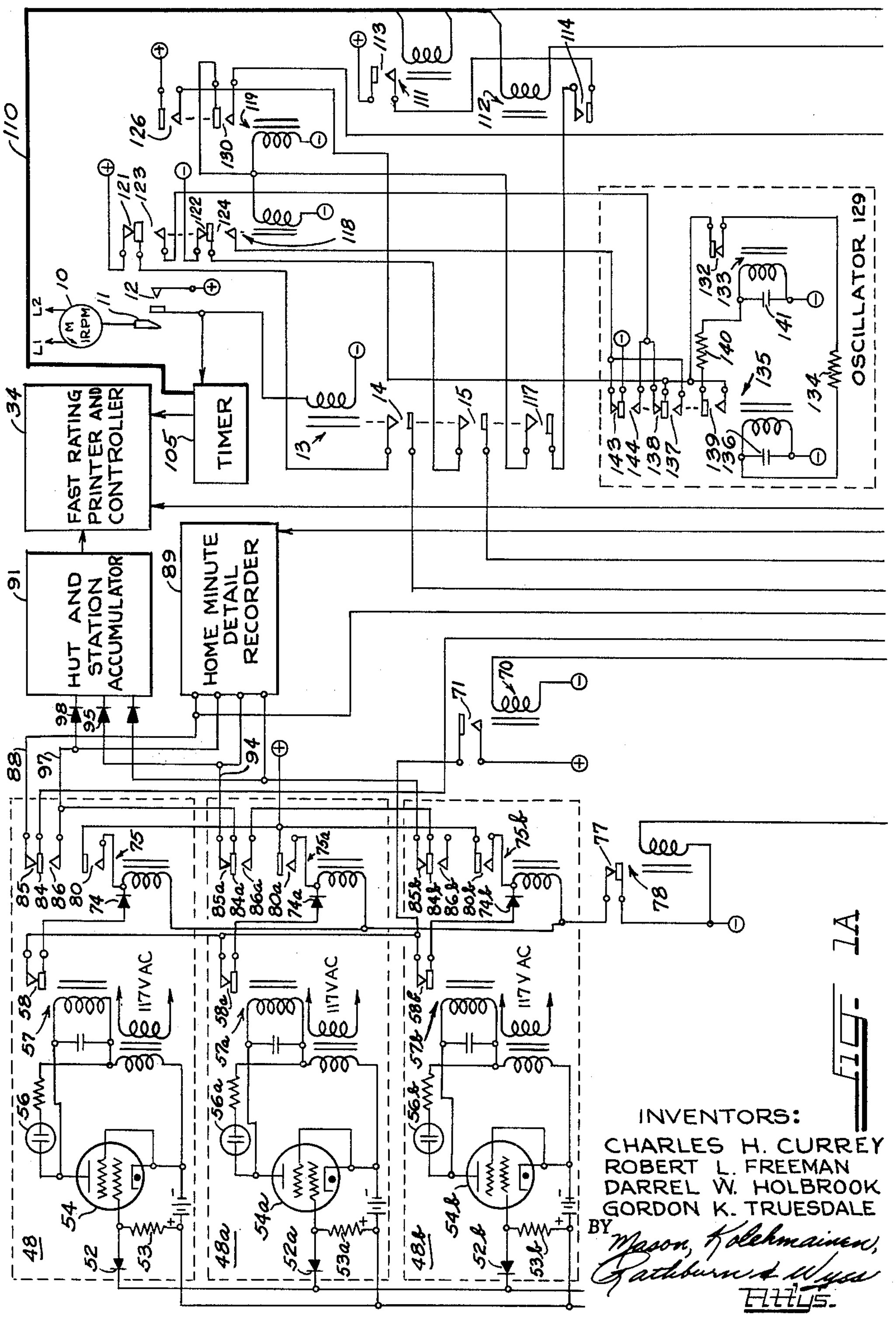

The present invention relates to a wave signal receiver monitoring system, and more particularly to an improved system for monitoring, from a remote location, a plurality of wave signal receivers to determine the extent of use of each receiver. The system of the present invention is an improvement of the system disclosed in patent application, Serial No. 740,639, filed June 9, 1958, by Charles H. Currey et al., now Patent No. 3,070,798.

The system disclosed in the above-mentioned application comprises a plurality of receiver attachments respectively connected to each of a plurality of receivers in the system and to a central office for providing at the central office data pertaining to the operation of each receiver in the system during every minute of the day. This data is automatically tabulated once each minute at the central office to provide both "Fast Ratings" and "Home Minute Detail" information. These terms are well known in the art and defined in considerable detail in the said application, but very briefly, fast ratings are provided at the end of each minute and are derived from the total number of homes using television and the total number of homes tuned to receive certain channels, and home minute detail information is a detailed record of the operating condition of each receiver in the system on a minute-by-minute basis.

In order to maintain receiver identity, the system disclosed in the said application utilizes separate telephone line connections between the central office and each of the receiver attachments, and the rental cost of the large number of telephone line connections which are thus required to provide satisfactory sampling in a large city is extremely high. Therefore, it would be desirable to modify the system to appreciably reduce the required number of telephone line connections without in any way reducing the data transmitted to the central office.

Therefore, a principal object of the present invention is to provide a new and improved system for monitoring a plurality of wave signal receivers at a remote location.

Another object of the invention is to provide a new and improved wave signal receiver monitoring system which employs a common signal link between a central office and a plurality of remotely disposed receiver attachments for supplying receiver operating condition signals to the central office.

Still another object of the present invention is to provide a new and improved wave signal receiver monitoring system in which a plurality of receiver attachments are multiplexed on the same signal link in a manner to preserve receiver identity.

Yet another object of the present invention is to provide a new and improved multiplexing arrangement suitable for use in a wave signal receiver monitoring system of the type employing telephone line connections between the individual homes in the system and a central office.

A further object of the present invention is to provide a new and improved wave signal receiver monitoring system including means for automatically determining the operativeness of the receiver attachments in the system.

A still further object of the invention is to provide a wave signal receiver monitoring system in which the base count of the system is automatically provided.

Briefly, the above and further objects are realized in accordance with the present invention by providing a television receiver monitoring system in which a plurality of receiver attachments are respectively connected to each receiver in the system for producing output signals characteristic of the operating condition of the associated receiver. The system further includes a plurality of telephone line connections which each connect a group of the receiver attachments to the central office, and a time sharing arrangement is employed by the receiver attachments on each line whereby each receiver places its operating condition signal on the line during a unique time interval. At the central office the signals are decoded and supplied to home minute detail recorders and to HUT and television channel accumulators.

Inasmuch as the various ratings are computed from data obtained from a relatively small number of homes, it is most important to know the total number of homes in the system at all times. Moreover, as a practical matter, any home containing an inoperative receiver is not in the system, and therefore, the present system includes means for automatically providing an indication, at periodic intervals, the number of operative receiver attachments in the system. In the art, and hereinafter, this number is referred to as the base count of the system.

Further objects and advantages of the present invention will become apparent as the following description proceeds, and the features of novelty which characterize the invention will be pointed out with particularity in the claims annexed to and forming a part of this specification.

Figure 1B:
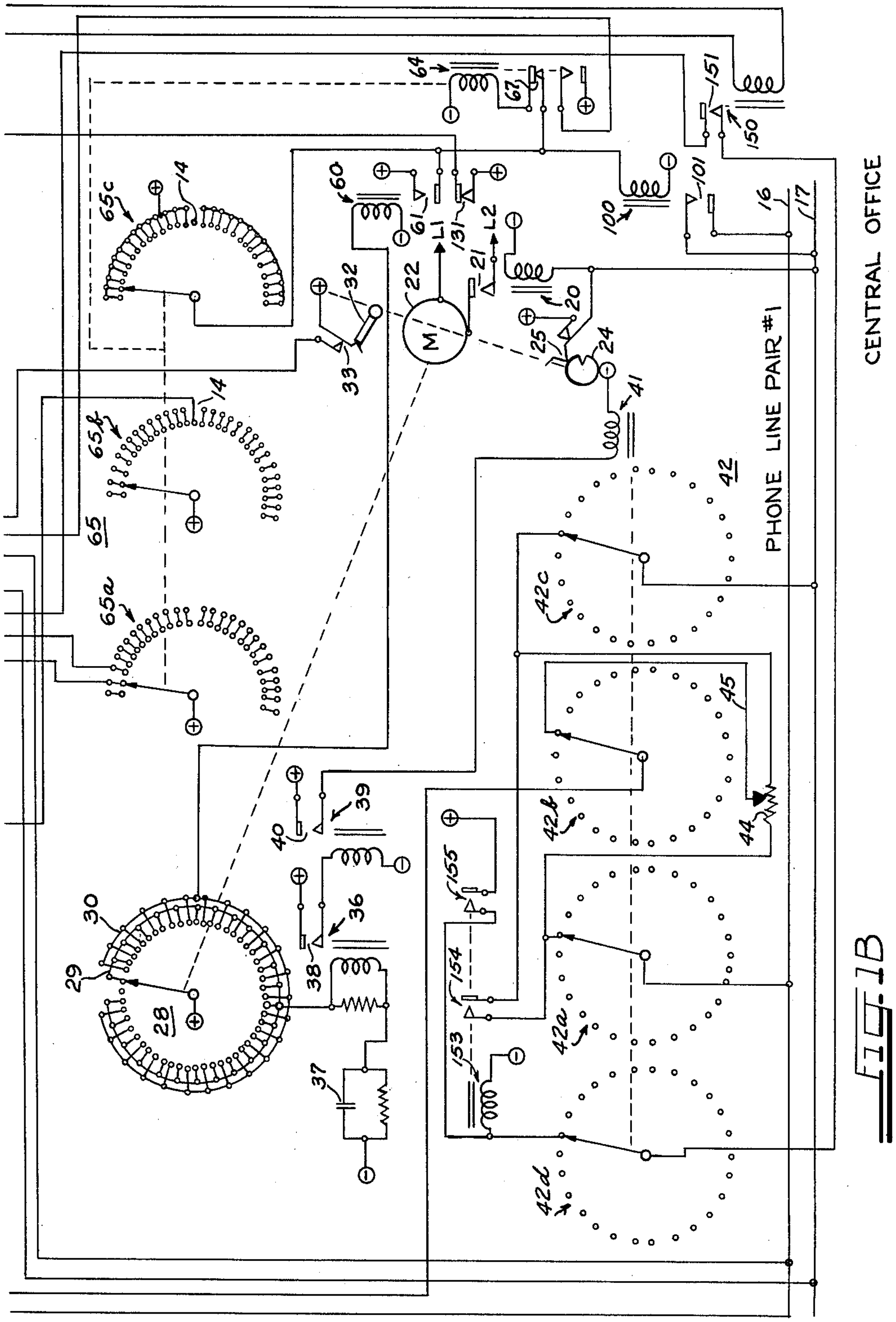
Figure 2A:
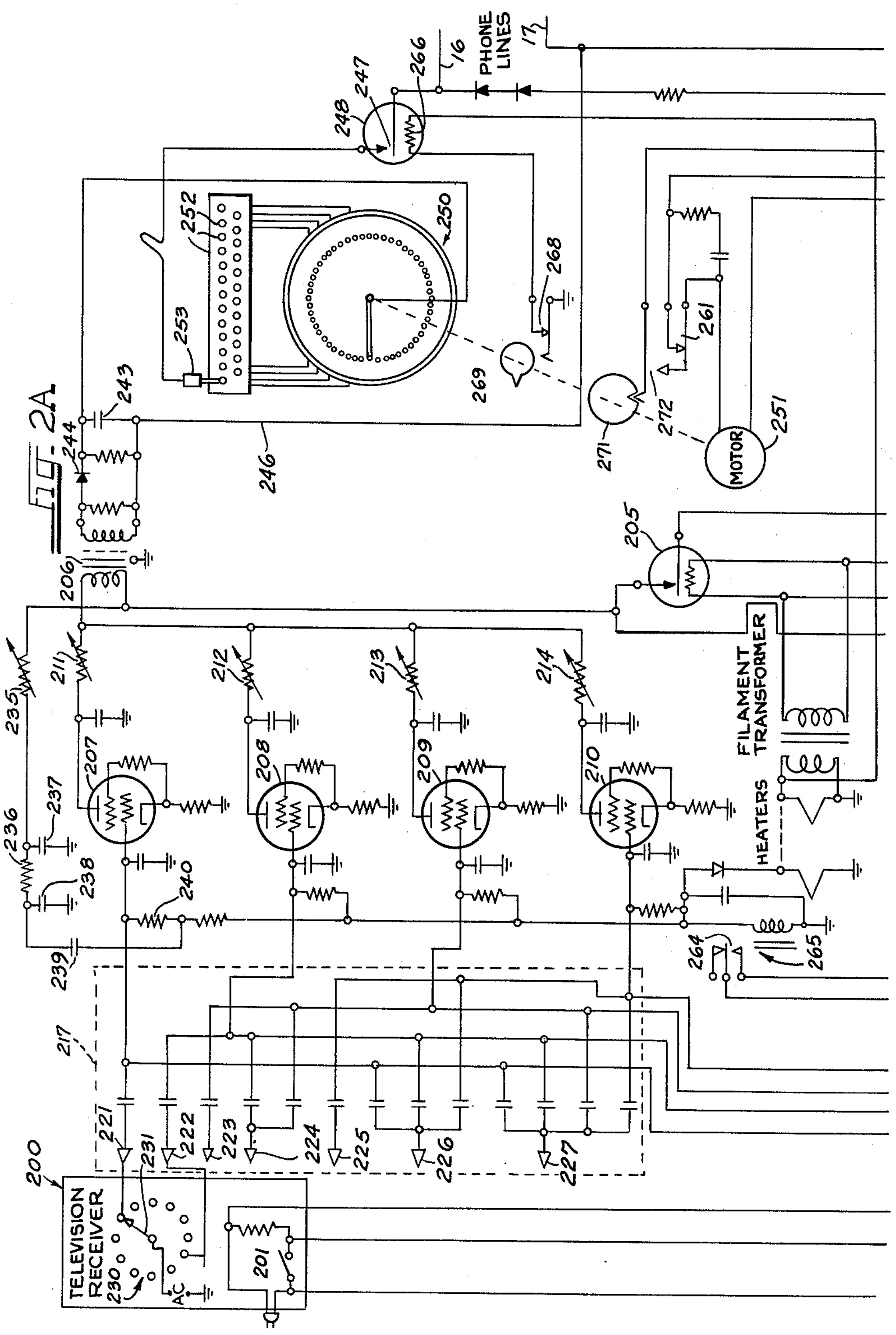
Figure 2B:
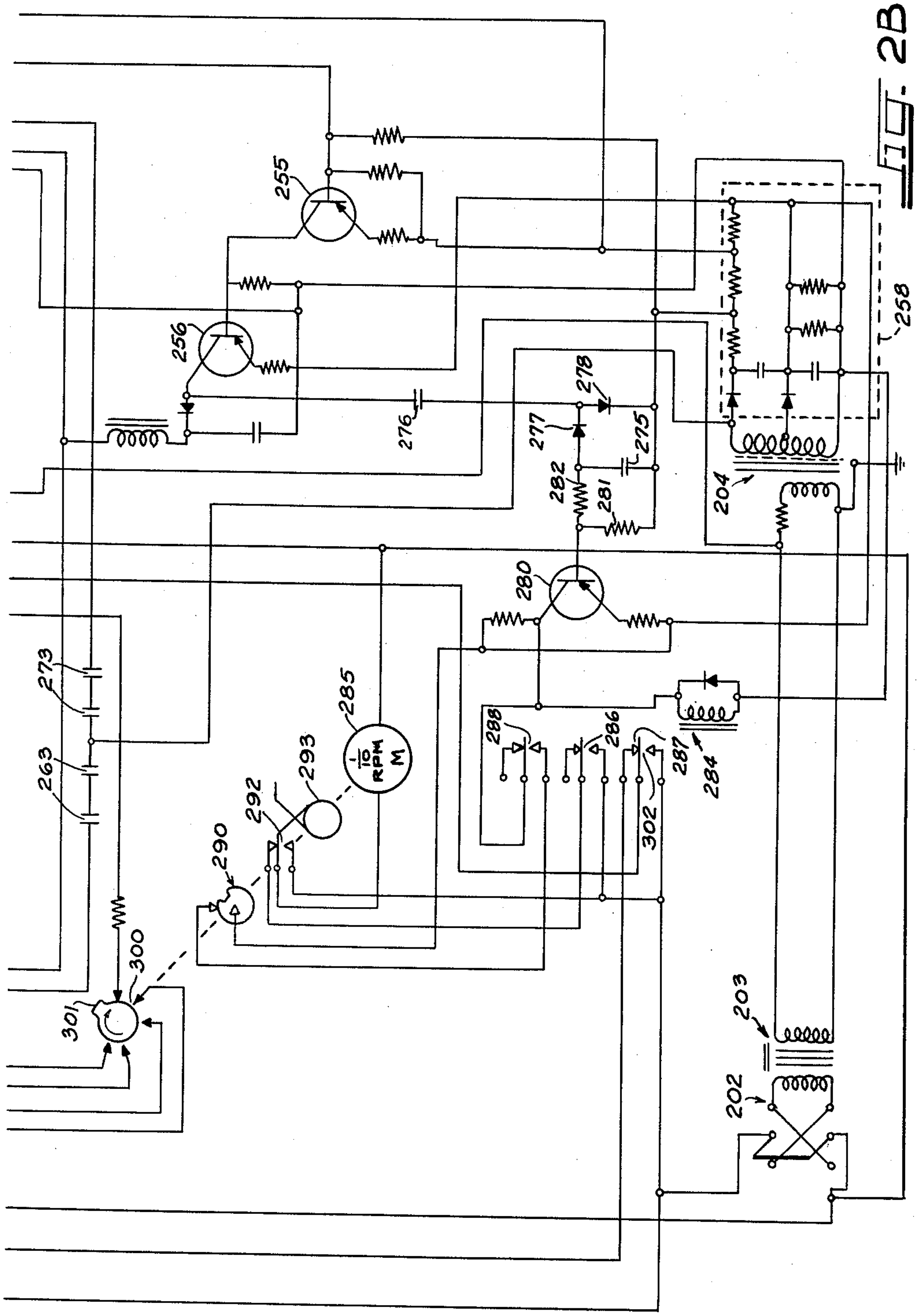

For a better understanding of the present invention, reference may be had to the accompanying drawings in which:

FIGS. 1*a* and 1*b* form an electric circuit partly in block diagram form of the central office equipment used in a system embodying the present invention; and FIGS. 2*a* and 2*b* form a schematic circuit diagram of a receiver attachment used in a system embodying the present invention.

*Central Office Equipment*

Referring now to the drawings, and particularly to FIGS. 1*a* and 1*b* thereof, there is shown the central office equipment of a monitoring system in which each receiver in the system is sampled once each minute and data relating to the operating condition thereof is recorded. In addition, the data is segregated and accumulated to provide at the end of each minute the total number of homes in the system using television and the total number of receivers tuned to each of a plurality of monitored television channels.

Once each minute a home scan cycle is commenced by means of a one r.p.m. synchronous motor 10 which is energized from across a pair of A.C. power lines L1 and L2 and which drives an arm 11 for momentarily closing a set of normally open contacts 12 once each minute. Closure of the contacts 12 operates a relay 13 to close respective sets of normally open contacts 14 and 15 thereof which then connect a D.C. interrogating voltage across a pair of telephone lines 16 and 17 to make the line 17 positive with respect to the line 16. As more fully described hereinafter, a plurality of receiver attachments are also connected across the lines 16 and 17. The present system is designed for monitoring a three-hundred receiver sample once each minute and employs twelve telephone line pairs having twenty-five receiver attachments connected across each pair. The groups of homes on each line are scanned simultaneously, and therefore, the relay 13 includes additional sets of normally open contacts (not shown) for simultaneously placing the D.C. interrogating voltage on all of the lines. As more fully described hereinafter, the D.C. interrogating voltage which is thus placed across the telephone lines 16 and 17 and the other line pairs in the system initiates operation of the synchronous motors in all of the receiver attachments thereby to cause the receiver attachments to selectively place their respective operating condition indicating voltages on the associated lines.

Simultaneously with the starting of the synchronous motors in the receiver attachments, a relay 20 at the central office is operated to close a set of normally open contacts 21 thereof which thus connects a synchronous motor 22 across the A.C. power lines L1 and L2. Since the interrogating pulse is of short duration, the energization circuit for the motor 22 includes a holding circuit comprising a cam 24 which controls a set of normally closed contacts 25 connected between a positive battery terminal and the coil of the relay 20. Accordingly, the motor 22 continues through one complete revolution each time that it is started.

In order to scan each of the twenty-five homes connected across the telephone line pairs 16 and 17, the motor 22 drives the wiper of a home scan switch 28. A similar home scan switch or a slave stepping switch operated in synchronism with the switch 28 is provided for each of the other telephone lines in the system. The switch 28 has fifty-two contacts with alternate ones thereof respectively interconnected by a pair of conductors 29 and 30. In order to provide a period at the end of each home scanning cycle in which to print out the fast ratings, the homes should be scanned in substantially less than one minute, and in the present system the homes are scanned in forty-eight seconds. Accordingly, the wiper of the switch 28 makes one complete revolution in forty-eight seconds, and therefore, the motor 22 includes a suitable gear train so as to drive the wiper of the switch 28 at the rate of one and one-quarter revolutions per minute.

At the completion of the home scan period, a print order is supplied under the control of the motor 22 to a Fast Rating printer and Controller 34 which causes it to print the HUT and channel totals. Accordingly, the motor 22 drives a switch actuating arm 32 which closes a set of normally open contacts 33 near the end of each minute to connect a positive battery voltage to the Fast Rating printer and Controller 34. The Fast Rating printer and Controller circuits are substantially identical to those described in the above-mentioned copending application and a deailed description thereof may be found therein.

The wiper of the switch 28 is shown in the first contact position having been stepped one position by the motor 22 since the initiation of the interrogating signal. In this position, positive battery is connected by the switch 28 and the conductor 29 to the coil of a relay 36. In order to cause the relay to operate for a very short period of time, a charging capacitor 37 is serially connected between the coil thereof and negative battery, so that the relay 36 remains operated only while the capacitor is being charged and by a proper selection of circuit parameters for less than the dwell time of the wiper on any of contacts of the switch 28.

Upon operation of the relay 36, a set of normally open contacts 38 thereof are closed to connect positive battery to the coil of a relay 39. Operation of the relay 39 closes a set of normally open contacts 40 thereof to energize the control solenoid 41 of a home scanning stepping switch 42 having a plurality of banks 42*a*, 42*b*, 42*c*, and 42*d*. Accordingly, when the wiper of the switch 28 moves to the first contact position and momentarily operates the relay 36, the stepping solenoid 41 is momentarily energized and when released causes the wipers of the switch 42 to step to the first contact positions as shown. The wipers of the switch banks 42*a* and 42*c* are respectively connected to the telephone lines 16 and 17 and since the wipers of the switch 28 are driven in synchronism with the sychronously driven switch mechanisms in the receiver attachments, when the wipers of switch 42 are in the first contact position the first home receiver attachment connected across the associated phone lines 16 and 17 is applying the operating condition voltage to the phone lines.

With the wipers of the switch 42 in the first contact position a potentiometer 44, which is connected between the first contacts in the first and third banks of the switch 42, is connected across the telephone lines 16 and 17 and an adjustable voltage is tapped off therefrom and connected via a conductor 45 to the first contact of the second bank 42*b* of the switch 42 and thus connected through the wiper thereof to each of a plurality of thyratron decoding circuits generally designated 48, 48*a*, and 48*b*. The decoding circuits 48, 48*a*, and 48*b* are identical and the number of them to be used for each line in any system is one greater than the number of channels to be monitored, but in order to facilitate an understanding of the present invention, only three decoding circuits have been shown, and therefore, two channels can be monitored by the disclosed system, but it will be understood that a larger number of decoding circuits can readily be used where additional channels are to be monitored. For example, eight thyratron circuits are used for monitoring receivers located in New York city where there are seven local VHF television stations. Since these circuits are identical, like parts are designated with the same numbers but the suffixes *a* and *b* are respectively added to the parts in the circuits 48*a* and 48*b*.

Considering the decoding circuits in detail, the voltage from the wiper of the switch bank 42*b* is connected through a diode 52 in each of the circuits 48, 48*a*, and 48*b* across a grid leak resistor 53 and thus between the cathode and firing electrode of a thyratron 54. The signals placed on the telephone lines 16 and 17 by the homes are D.C. voltages in which the telephone line 16 is rendered positive with respect to the line 17 whereby selected ones of the thyratrons 54 are cut off if the voltage from the home being interrogated is sufficient to overcome the respective bias voltages thereon, which, in the absence of a signal, are sufficient to maintain the thyratrons 54 conductive. The thyratrons 54 in each of the decoding circuits 48, 48*a* and 48*b* are biased to different values such that a minimum voltage on the lines 16 and 17, which occurs when a receiver is energized but not tuned to a monitored channel, cuts off the thyratron 54 in the circuit 48 but does not cut off the thyratrons in the circuits 48*a* and 48*b*. A voltage of somewhat greater magnitude, which indicates that the associated receiver is tuned to receiver station A, for example, causes the thyratrons 54 and 54*a* in both of the decoding circuits 48 and 48*a* to be cut off, and a voltage of still greater value, which indicates that the receiver being sampled is tuned to channel B, causes all three thyratrons 54, 54*a*, and 54*b* to be cut off. With a thyratron 54 cut off, an associated neon glow tube indicator is energized and, in addition, a relay 57, which is connected in the anode circuit of the thyratron 54, is released thereby to close a set of normally closed contacts 58. Assuming an unidentified listening voltage on the line, the contacts 58 in the decoding circuit 48 are closed but the corresponding contacts in the circuits 48*a* and 48*b* are open. Accordingly, the operating conditions of the relays 57, 57*a* and 57*b* indicate the operating condition of the receiver being sampled.

The home scan switch 28 has at least twice as many contact positions as there are individual receiver attachments multiplexed on a line, and the responding signals from corresponding homes connected to each line are simultaneously provided on all of the lines in the system while the wiper of the switch 28 dwells in the second contact position of each pair of contacts thereof. Accordingly, when the wiper steps to the second contact position, the responding signal from the first home on each line in the system appears on the associated telephone line pair, and the thyratrons 54 in the respective decoding circuits connected to each of the phone line pairs are in the condition to indicate the receiver operating condition in each of the first homes.

In order to scan the signals on the twelve line pairs in the system and selectively connect the receiver operating condition data to the totalizing and printing equipment, a line scan stepping switch 65 is provided. When the wiper of the switch 28 steps to the second contact position, it connects positive battery to the coil of a relay 60 which closes a set of normally open contacts 61 thereof to energize the stepping solenoid 64 of the stepping switch 65. As shown, the switch 65 has a plurality of switching banks respectively designated 65*a*, 65*b*, and 65*c*. When the stepping solenoid 64 is actuated, a set of normally closed auxiliary contacts 67 thereof are opened which deenergizes the solenoid 64 and causes the wipers of the switch 65 to step to the first contact positions as shown. Thereafter, the operation of the switch 65 is under the control of the third bank 65*c* thereof and self-steps to the fourteenth contact position where it stops, the first thirteen contacts being connected to positive battery but the fourteenth contact being open.

In order to prevent an erroneous record should a receiver be re-tuned while it is being scanned, and to minimize the time that the receiver attachment signals need be retained on the lines, when the switch 65 steps to the first contact position a latching voltage is supplied to all of the output circuits of the decoding circuits to maintain them in their present condition after the thyratrons 54 are rendered conductive. Accordingly, when the wipers of the line scan switch are in the first contact positions, the first switch bank 65*a* supplies positive battery to the operating coil of a relay 70 which closes a set of normally open contacts 71 thereof to supply positive battery to one contact of the normally closed contacts 58 in each of the thyratron decoding circuits 48, 48*a* and 48*b*. If any of these sets of contacts are closed, positive battery is further connected therethrough to a diode 74 and thus to the coil of an associated relay 75 which is connected to minus battery through a set of normally closed contacts 77 on a relay 78.

As shown, the relays 75 each include a set of normally open latching contacts 80 which are connected between the positive side of the relay coil and positive battery. Consequently, when the switch 65 steps to the first contact position the relays 75 in the thyratron circuits 48, 48*a*, and 48*b* are respectively operated if the associated thyratron is cut off at that time by virtue of a signal supplied thereto from the associated telephone line pair. It should be understood that when switch 65 steps to the first contact position the relays in all of the thyratron decoding circuits 48, 48*a*, and 48*b* which are respectively associated with each of the twelve line pairs in the system are latched in accordance with the operating condition information supplied thereto. Now, when the switch 65 self-steps to the second contact position the first switch bank 65*a* connects positive battery to a common contact 84 of a set of normally closed contacts 85 and a set of normally open contacts 86. Accordingly, if the relay 75 of the HUT circuit 48 is deenergized at this time, meaning that the first home on the telephone line pair 16, 17 is not using television, positive voltage is supplied through the contacts 85 and a conductor 88 to a home minute detail recorder 89. The HUT and station accumulator may be identical to that described in the above-identified Currey application, and only one such unit need be provided for the entire system. On the other hand, a separate home minute detail recorder 89 is provided for each line pair in the system and each records the detailed receiver operating condition data for all of the homes connected to its associated line. The recorder 89 is preferably a perforator which punches a tape each time that a set of data is supplied thereto for recording. The recorder 89 may be a Motorized Tape Punch, Model 2, made by Commercial Controls Corp. of Rochester, New York. The recorder 89 thus makes a record of the detailed operation on a minute-to-minute basis of each receiver in the associated group. No timing signals need be supplied to the recorder 89 but preferably the record medium is pre-graduated with respect to time to facilitate transcribing of the information from the medium.

Assuming, as we have, that the relay 75 of the HUT circuit 48 is picked up, positive battery is connected via the normally open contacts 86 to the set of normally closed contacts 85*a* in the decoding circuit 48*a* and thus connected to the conductor 94 if the home being scanned is tuned to channel B. The conductor 94 is connected to one input terminal of the home minute detail recorder 89 and is also connected through a diode 95 to the HUT and station accumulator 91. Since a home which is tuned to receive channel B is also using television, an HUT signal is also supplied to the recorder 89 and the accumulator 91 via a conductor 97 and a diode 98. The contacts 85*b* of the decoding circuit 48*b* are similarly connected to the accumulator 91 and to the recorder 89. The voltage signal from the first home connected to the telephone line pair 16, 17 is thus recorded in the associated home minute detail recorder 89 and in the common HUT and station accumulator 91.

While the wiper of the switch 28 is still on the second contact position and the relays in the decoding circuits 48, 48*a* and 48*b* are still indicating the operating conditions of the receiver in the first homes on all of the telephone lines in the system, the wipers of the line scan switch 65 step through the third contact to the thirteenth contact positions thereby to sequentially supply positive voltage through the first bank 65*a* thereof to the respective thyratron decoding circuits associated with each of the other eleven lines in the system. Accordingly, the information pertaining to the first home on the remaining pairs of lines is sequentially supplied to the accumulator 91 and to the respective home minute detail recorders 89.

In order to remove from the telephone lines the signals from the first homes before the second homes place their signals on the lines, means is provided for short-circuiting the line pairs after the relays 75 have been latched. Therefore, as the wipers in the switch 65 step through the first thirteen contact positions, a positive voltage is supplied via the switching bank 65*c* to the coil of a relay 100 thereby to close a set of normally open contacts 101 thereof which are connected directly between the phone lines 16 and 17. Accordingly, the lines 16 and 17 are short-circuited for a sufficient length of time to discharge the distributed capacitance thereof which removes the signal which has been placed thereon by the first home. It will be noted that the relay 100 is initially operated when the voltage is initially supplied to the stepping solenoid 64 but the time required for the switch 65 to step to the first contact position and latch the relays in the decoding circuits 48 is substantially less than the time required to discharge the telephone lines and fire the thyratrons. Inasmuch as the relays 75 in the decoding circuits 48, 48*a*, and 48*b* have been latched prior to the effective discharging of the lines, the signals placed on the lines by the first homes have been preserved by the conditions of operation of the relays 75 and the operating condition signals can thus be safely removed from the lines without any loss of data. It will be understood, of course, that a set of normally open contacts similar to the contacts 101 are connected across each of the telephone line pairs in the system.

When the wipers of the line scan switch 65 reach the fourteenth contact position and stop, a positive voltage is supplied via the second bank 65*b* to the coil of the relay 78 thereby to open the normally closed contacts 77 and thus disconnect the operating coils of the relays 75 of the thyratron circuits 48, on all of the lines from negative battery. Accordingly, the relays 75 are released and the thyratron decoding circuits 48 are again ready for decoding the signals from the second homes on the lines and for supplying the decoded signals to the home detail minute recorders 89 and to the accumulator 91.

At the completion of the line scan for the first homes on each line, which is approximately one and one-half seconds after initiation of the interrogating cycle by the closing of the contacts 12, the wiper of the switch 28 steps to the third contact position to again momentarily operate the relay 36 in the manner described hereinbefore. Shortly thereafter the second home on each line places on the associated telephone line pair a D.C. voltage indicating the operating condition of its associated receiver. The system thus continues to re-cycle through each of the homes on each line until at the end of forty-eight seconds when the wiper of the switch 28 has completed one revolution the data from all three hundred homes in the system has been supplied to the recorders 89 and to the accumulator 91.

The switch actuating arm 32 now closes the set of contacts 33 thereby to connect positive battery to the Fast Rating printer and Controller circuit 34 which prints the information supplied thereto from the HUT and station accumulator 91 and also prints the calendar time which is supplied thereto from a timer 105. As shown, each minute when the contacts 12 are closed by the principal timing motor 10, a positive battery signal is supplied to the timer 105 wherein it is suitably recorded by a series of stepping switches. Preferably the timer 105 is substantially the same as the timer disclosed in the above-identified Currey et al. application, and a detailed description thereof can be found in that application.

In order to determine the operativeness of the individual receiver attachments in the system and to render any inoperative receiver attachment ineffective to alter the ratings, there is provided in accordance with the present invention a call-back circuit which periodically transmits from the central office over each of the telephone line pairs a unique signal which causes the receiver attachments to respond with predetermined D.C. voltages at predetermined times in a manner more fully described hereinafter in connection with FIGS. 2*a* and 2*b*.

Considering the call-back circuit in greater detail, once each day and preferably during the early hours of the morning, positive battery is supplied from the timer 105 through a cable 110 to the coils of a pair of relays 111 and 112 which are thus actuated to close respective sets of normally open contacts 113 and 114 thereof and supply positive battery to a set of normally open contacts 117 on the relay 13. Therefore, at the beginning of each minute when the contacts 12 are closed and the relay 13 is operated, positive battery is supplied to the coils of a pair of relays 118 and 119. As described hereinbefore, during normal operation of the system positive and negative battery are connected to the contacts 14 and 15, these voltages being supplied through sets of normally closed contacts 121 and 122 of the relay 118. However, in order to initiate the call-back cycle of operation at the receiver attachments, a different signal is placed on the line pairs, and therefore, the contacts 121 and 122 are open to prevent the usual synchronizing or interrogating pulse from being applied to the line. Instead, respective sets of normally open contacts 123 and 124 on the relay 118 are closed to apply a series of pulses to the contacts 14 and 15 of the relay 13 and similarly to all telephone line pairs in the system. These pulses are of the same polarity as the usual interrogating pulse and when received by the receiver attachments commence to call-back cycle of operation therein. It will be noted that following each of the pulses in this train there is a pulse of equal voltage and opposite polarity placed on the line pairs. This latter pulse functions to discharge the distributed capacitance of the line.

In order to generate the train of pulses for initiating the call-back cycle of operation, positive battery is connected through a set of normally open contacts 126 on the relay 119 to the input of a relay type oscillator 129 having a frequency of approximately five cycles per second. The relay 119 further includes a set of normally open holding contacts 130 through which positive battery is supplied from a set of normally closed contacts 131 on the relay 60, and as described hereinbefore, the relay 60 is first operated when the wiper of the switch 28 moves to the third contact position. Accordingly, the oscillator 129 is energized for approximately three and one-half seconds following the closure of the switch contacts 12.

Considering the operation of the relay oscillator 129, when positive battery is supplied thereto it is connected through a set of normally closed contacts 132 on the relay 133 and thus through a charging resistor 134 across the operating coil of a relay 135 across which is connected a charging condenser 136. Accordingly, after a predetermined time delay, which depends upon the time constant of the charging circuit for the capacitor 136, the relay 135 operates. While, however, the capacitor 136 is being charged, positive battery is connected through a set of normally closed contacts 138 of the relay 135 to the normally open contacts 123 of the relay 118 and thus to the telephone line 17. Similarly, negative battery is connected through a set of normally closed contacts 143 to the contacts 124. Accordingly, a D.C. voltage is applied to the telephone lines. When the relay 135 operates, positive battery is disconnected from the line 17 and connected to the line 16 through a set of contacts 137, and negative battery is connected to the line 17 through a set of contacts 144. With the relay 136 operated, positive battery is supplied through a set of normally open contacts 139 to the coil of the relay 133 through a charging resistor 140. A time delay or charging capacitor 141 is connected across the coil of the relay 133 to provide a predetermined time delay before the relay 133 operates. When the relay 133 operates, the contacts 132 are open and the relay 135 is released thus reversing the polarity of the D.C. voltage applied across the telephone lines.

As indicated above, during the call-back period each receiver attachment in the system should be placing an HUT voltage on the associated line. Therefore, when the HUT voltage is absent from any of the lines when a particular home is being scanned during the call-back period, the associated line shorting relay is operated. Therefore, after the call-back condition has been continuing for at least a minute and preferably for four minutes, a home check relay 150 is energized to test each receiver attachment in the system and to short-circuit the potentiometer 44 of any inoperative attachment. The relay 150 is operated by means of a signal from the timer 105 thereby to close a set of normally open contacts 151 thereof and connect the HUT conductor 88 to the wiper of the fourth bank **42*d* of the home scan switch 42. Additional contacts are provided on the relay 150 for similarly connecting the HUT output conductors of the other phone line circuits to the corresponding switch contacts. A plurality of line shorting relays 153 are respectively provided for each home on each line and the coils of these relays are connected between negative battery and the contact in switch bank 42*d* corresponding to the home in question. There are thus twenty-five such relays provided for each line. Since the relays 153 are all connected alike, only one is shown and that is for the first home position of the first line pair. It includes a set of normally open contacts 154 connected between the first contacts of switch sections 42*a* and 42*c* so that if the relay 153 is operated the signal from the home in question is short-circuited before it can be applied to the decoding circuits 48. As shown, the relay 153 includes a set of normally open holding contacts 155 which are connected to the normally open contacts 151 of the relay 150 so that during the forty-eight seconds immediately following the operation of the relay 150, each of the homes on all of the lines are scanned and if a signal voltage is provided on the conductor 88, this being an indication that no HUT voltage is on the line, the associated line shorting relay 153 is operated thereby to short out the potentiometer 44. As the home scan switch 42 thus steps through the twenty-five home contact positions, the line shorting relays associated with any inoperative receiver attachments are operated. During the home scan period immediately following that scan period during which the operation of the receiver attachments are checked the HUT signals are still being placed on the lines and the HUT reading provided by the Fast Rating printer 34 thus indicates the total number of receiver attachments in the system whose lines have not been shorted by the relay 153**. This HUT number is thus the base count of the system.

*Receiver Attachment*

Referring to FIGS. 2*a* and 2*b* there is shown a schematic circuit diagram of a receiver attachment which, except for the time interval during which it is responds, is identical to every other receiver attachment in the system. As shown, the receiver attachment is connected to a wave signal receiver such, for example, as a television receiver 200 which includes an on-off power switch 201. The attachment is powered by A.C. voltage taken either from the power input lines in the receiver 200 or from another suitable source is connected through a phase reversing switch 202 and an isolating regulating transformer 203 across the primary winding of a transformer 204. The primary winding of the transformer 204 is connected at one end to ground and is connected at the other end to a set of normally open switching contacts of a thermally operated time delay relay 205. The relay 205 is energized when the receiver is energized through a set of normally closed contacts 287 on a call-back relay 284 which is operated only during the call-back operation. Its purpose is to delay the application of anode voltage to a thyratron encoding circuit until the thyratron cathodes have been sufficiently heated to prevent damage to the cathodes. A.C. anode voltage is thus supplied through the switch 205 and the primary winding of a coupling transformer 206 to the anodes of a plurality of encoding thyratrons 207, 208, 209 and 210 through a plurality of adjustable resistors 211, 212, 213, and 214.

The control electrodes of the thyratrons 207–210 are adapted to be energized from a capacitor adding matrix 217 which, in the illustrated embodiment of the invention, is provided with seven input terminals respectively designated 221, 222, 223, 224, 225, 226, and 227. However, in order to facilitate an understanding of the present invention, it has been assumed that the system is adapted for monitoring only two stations, and therefore, only the first two terminals 221 and 222 are shown as being connected to respective contacts on a switch 230 which is connected to the channel selector shaft of the receiver 200 thereby to connect an A.C. voltage to one or the other of the input terminals 221 or 222, depending upon which of the two monitored channels the receiver is tuned to receive. If, however, seven input signals were to be derived from the receiver 200, such, for example, as in an area where seven local channels may be tuned in and it is desired to monitor all of them, all seven input terminals 221–227 would be connected to respective contacts on the switch 230 and seven different values of current could be provided in the primary winding of the transformer 206 depending upon the particular ones of the thyratrons 207–210 which were energized. Should the receiver 200 be energized but none of the channels being monitored is tuned in, the A.C. supply voltage which is connected through a pair of resistors 235 and 236 and across a pair of shunt capacitors 237 and 238 and through a series capacitor 239 and resistors 240 to the input circuit of the thyratron 207 fires the thyratron 207 in the latter portion of the A.C. cycle. Accordingly, an HUT voltage, which is less than any of the channel indicating voltages, is developed across an output capacitor 243 which is serially connected with a diode 244 across the secondary winding of the transformer 206. The lower terminal of the capacitor 243 is connected via a conductor 246 to the phone line 17 and the upper terminal thereof is connected through a switch 250 and set of normally open contacts 247 on a thermally operated time delay relay 248 to the other telephone line 16.

In order to selectively connect the operating condition indicating voltage from across the capacitor 243 to the telephone lines 16 and 17 during the predetermined time interval assigned to the home in question, the switch 250 is driven by a synchronous motor 251 in synchronism with the switch 28 at the central office. The switch 250 like the switch 28 is a fifty-two position switch and in only one position of this switch is the voltage from the capacitor 243 connected across the telephone lines 16 and 17. In order to provide receiver attachments which are interchangeable from home to home, the connection between the contacts 247 and the switch 250 is provided by a jack pin 253 which may be connected to any one of twenty-five contact receptacles 252 which are respectively connected to twenty-five alternately disposed or even numbered contacts on the switch 250. Therefore, if the home in question is the first home on the line, the jack pin 253 is inserted into the first contact receptacle 252, whereas, if it is the *n*th home on the line then the jack pin 253 is placed in the *n*th one of the receptacles 252.

During the twelve second read-out period following a home scan cycle, the motor 251 in each receiver attachment is stopped and must be quickly started when an interrogating voltage is received. Therefore, in accordance with one aspect of the invention, A.C. voltage is continuously supplied to the motor 251 and D.C. voltage is superimposed upon the A.C. voltage to prevent it from running during the read-out period. However, when the interrogating signal is received a transistorized switching circuit is operated to remove the D.C. voltage from the motor 251 and to thus permit it to start.

Considering the control circuit for the motor 251 in greater detail, when an interrogating voltage is placed on the lines by the central office, the line 17 is rendered positive with respect to the line 16, and therefore, a PNP transistor 255 is rendered conductive to effectively connect the base of a PNP transistor 256 to a positive output terminal of a power supply rectifier 258 which is energized from across the secondary winding of a transformer 204. This cuts off the transistor 256 and starts the motor 251 by disconnecting a D.C. voltage therefrom. Prior to this, with the transistor 256 conducting, D.C. voltage is supplied from the power supply 258 through a set of motor control normally closed contacts 261 to one terminal of the synchronous motor 251, the other terminal of the motor being connected to the negative output terminal of the power supply 258. The D.C. voltage thus prevents the motor 251 from running even though A.C. voltage is supplied thereto from the secondary winding of the transformer 204 through a pair of series connected capacitors 263 and a set of normally open contacts 264 on a relay 265. As shown, the coil of the relay 265 is connected in parallel with the heaters of the thyratrons 207–210 and, therefore, when the receiver 200 is energized the relay 265 operates. When the interrogating or synchronizing voltage pulse is received from the lines 16 and 17, the D.C. voltage previously supplied to the motor 251 through the transistor 256 is removed and the motor thus commences to run. Therefore, the wiper of the switch 250 scans the contacts thereof and when it engages the particular contact which is connected through the jack pin 253 to the normally open contacts 247, the operating condition voltage from the capacitor 243 is connected across the phone lines 16 and 17.

As shown, the time delay device 248 includes a heater 266 which is energized from the secondary winding of the filament transformer 267 through a set of normally closed contacts 268 which are opened by a switch actuating cam 269 driven by the motor 251 a short time before the wiper of the switch 250 engages that contact which is connected through the jack pin 253 to the normally open contacts 247. The function of the switch 268 is to permit the contacts 247 to open if the switch 250 should become stuck on that particular contact position wherein the voltage from the capacitor 243 is connected to the telephone lines. Otherwise, if the switch 250 stopped in this position a voltage would be continuously supplied to the telephone lines and the entire line would be rendered inoperative.

Shortly after operation of the motor 251 is initiated, a cam 271 thereon closes a set of normally open contacts 272 and opens the contacts 261 thereby to connect A.C. energizing voltage from the secondary winding of the transformer 204 through a pair of serially connected capacitors 273 to the motor 251 and to prevent the application of D.C. voltage to it, the alternate A.C. energization path being provided so that should the receiver 200 be deenergized while the motor 251 is operating, the motor shaft will return to its home position before stopping.

When a call-back signal is placed on the line, which, as indicated hereinbefore, comprises a plurality of voltage pulses occurring at the rate of approximately five pulses per second, the connection between the emitter and collector of the transistor 256 is interrupted at a rate of five cycles per second. With the pulses occurring at this rate, a capacitor 275 is charged through a capacitor 276 and a network of diodes 277 and 278 to a voltage sufficient to render a transistor 280 conductive. As shown, a pair of resistors 281 and 282 are serially connected across the capacitor 275 thereby to determine the pulse rate required render the transistor 280 conductive. This circuit is required to prevent the trailing edges of the operating condition voltages placed on the telephone lines by the receiver attachments from switching the receiver attachments on the line into a call-back condition of operation.

When the transistor 280 is fired, the coil of the call-back relay 284 which is connected in the collector-to-emitter circuit thereof is operated to energize a one-tenth r.p.m. call-back signal control motor 285 through a set of normally open contacts 286 thereof. Moreover, the relay 284 is held in operative condition through a holding circuit comprising a set of normally open contacts 288 thereon and a normally closed cam operated switch 290 which is driven by the motor 285. Also when the motor 285 is first energized, the energization circuit thereof is switched from the contacts 286 to a path which includes a set of normally open contacts 292 operated by a cam 293 on the shaft of the motor 285. Therefore, the motor 285 continues to operate for ten minutes although the call-back initiation signal lasts only three seconds. Thus, the transistors 255, 256, and 280 and the circuits associated therewith provide a detecting means selectively responsive to the interrogating and call-back signals supplied by the central office.

About two minutes after the motor 285 has been operating, a contact 300 is engaged by a motor driven wiper 301 to supply a firing voltage to the grid of the thyratron 207. Anode voltage is supplied through the contacts of the time delay device 205 which are closed at this time through a set of normally open contacts 302 on the relay 284 irrespective of whether the receiver is energized. During the succeeding two minutes of operation the thyratron 208 is fired, during the following two minutes the thyratron 209 is fired, and finally during the next two minutes the thyratron 210 is fired. In this way different voltages are supplied to the telephone lines during succeeding two-minute intervals of the call-back period to enable checking the operation of each of the thyratrons 207–210 at the central office. During the call-back operation, all of the homes on each line are scanned in the usual manner by the central office, but at this time the voltages which should be placed on the lines by the receiver attachments are known. Therefore, a reading of the home minute detail records made during the call-back period indicates the operativeness of each receiver in the system. Moreover, the line shorting relays 153 previously described in connection with the central office equipment of FIG. 1 are selectively operated to effectively disconnect from the system any receiver attachments which are not putting out a voltage during the call-back period.

While particular embodiments of the invention have been shown, it will be understood, of course, that the invention is not limited thereto, since many modifications may be made, and it is, therefore, contemplated by the appended claims to cover any such modifications as fall within the true spirit and scope of the invention.

What is claimed as new and desired to be secured by Letters Patent of the United States is:

1. Apparatus for monitoring the operating condition of a plurality of wave signal receivers, comprising a plurality of receiver attachments respectively connected to said receivers and separated into first and second groups, a plurality of coding means respectively provided in said attachments for producing output signals indicative of the operation of the associated receiver, a central office, a first circuit connected between said central office and said first group of said attachments, a second circuit connected between said central office and said second group of said attachments, means in said receiver attachments to connect and disconnect the operating condition signals from said coding means to said circuits in a predetermined sequence, a plurality of recorders each connected to one of said first and second circuits and responsive to the operating condition signals concurrently received from said circuits for recording the individual operating conditions of said receivers in the first and second groups, and another recorder responsive to said operating condition signals from both of the first and second circuits for recording the total number of said receivers operating in each of a plurality of predetermined operating conditions.

2. Apparatus for monitoring a plurality of wave signal receivers from a central office remotely disposed with respect to said receivers, comprising a plurality of receiver attachments respectively connected to said receivers, a circuit interconnected between said central office and said attachments, means at said central office for placing a D.C. voltage on said connection to initiate a scanning operation, means in said receiver attachments responsive to said D.C. voltage for causing said attachments to respectively place operating condition indicating signals on said line in a predetermined sequence, the amplitudes of said last named signals indicating the operating conditions of the associated receivers and the period during which a response is made identifying the receiver, and means at said central office responsive to said signals for totalizing the number of like responses from said receiver attachments.

3. In monitoring apparatus of the type including a plurality of remote stations connected via a single signal link to a central office, the combination of a plurality of encoding means respectively disposed at said stations for producing coded signals indicative of information supplied thereto from a wave signal receiver, sequentially operated means at said stations to provide time sharing of said signal link by selectively connecting said signals to said signal link in a predetermined time sequence so that only one coded signal is on said signal link at any one time, means in said central station for concurrently placing the sequentially operated means in said remote stations in operation to initiate a cycle of transmission, decoding means at said central office responsive to said coded signals for selecting at least one of a plurality of output connections for indicating said information supplied from said receivers via said coded signals, and means at said central office for connecting said signal link to said decoding means during each period of time during said cycle of transmission when a coded signal may be placed on said line by said sequentially operated means, at other times during said cycle of transmission said signal link being disconnected from said decoding means.

4. The combination set forth in claim 3 which further includes means at said central office for removing each of said coded signals from the signal link before another coded signal is placed thereon.

5. The combination set forth in claim 4 wherein said signal link is a telephone line pair and said last named means comprises structure for short-circuiting said line to remove said signals.

6. A system for monitoring from a remote location a plurality of wave signal receivers, comprising a central office, a first plurality of receiver attachments respectively connected to a plurality of said receivers for providing output signals indicative of the operating conditions of the associated receivers, a first telephone line connection interconnecting said attachments and said central office, a second plurality of receiver attachments respectively connected to a second plurality of said receivers for providing output signals indicative of the operating conditions of the associated receivers, a second telephone line connection interconnecting said second plurality of attachments and said central office, means at said central office for periodically placing an interrogating signal on said first and second lines, synchronous driven motor means in each of said attachments and responsive to said interrogating signal for connecting the respective output signals to the associated line during different portions of a predetermined time interval following the reception of said interrogating signal, separate synchronous motor driven means in said central office for examining the output signals applied to each of said lines during each of the portions of said predetermined time interval to separate the output signals on each of said lines to provide receiver identification, and scanning means for scanning both of said lines during each of said portions of said predetermined time interval when output signals from two of said attachments are concurrently provided on said lines for separating said concurrently provided output signals, and recorder means responsive to said output signals for providing a record of the operating condition of each of said receivers throughout a predetermined period.

7. A system for monitoring the tuning conditions of a plurality of geographically remote wave signal receivers comprising a plurality of groups of receiver attachments each connected to one of said wave signal receivers, each of said attachments including transmitting means for transmitting an output signal representing the tuning condition of the connected receiver, a central office, a plurality of telephone lines each connecting one group of said attachments to said central office, means in said central office for concurrently transmitting interrogating signals over all of said lines, means in said attachments controlled by said interrogating signals for controlling the transmitting means in said attachments to transmit said output signals over said telephone lines to said central office, said transmitting means being controlled so that attachments in each group transmit output signals in a time spaced sequence and attachments in all of said groups transmit concurrently over said lines, a plurality of detecting means each connected to one of said lines for receiving the output signals concurrently transmitted from said plurality of lines, totalizing means for indicating the total number of receivers in each different tuning condition, switching means operable through a control cycle to render said totalizing means responsive to control by each of said detecting means in sequence, means for operating said switching means through one control cycle for each group of output signals concurrently received by said plurality of detecting means, recording means controlled by said plurality of detecting means for producing an individual record of the tuning condition of each one of said wave signal receivers, and means including said switching means for selectively rendering said recording means responsive to control by said plurality of detecting means.

8. In monitoring apparatus in which a plurality of receiver attachments are periodically interrogated from a remotely disposed central office to provide at the central office, on a periodic basis, a record of the operating conditions of a plurality of wave signal receivers respectively connected to said attachments, the combination of means at said central office for developing a unidirectional voltage of a given polarity for transmission to said attachments, means at said central office for developing a train of voltage pulses of said given polarity at a predetermined frequency for transmission to said attachments, detecting means in said receiver attachments responsive to the said unidirectional voltage and said train of voltage pulses for producing two distinct outputs, first means at the receiver attachments responsive to one of the two outputs of the detecting means for controlling the receiver attachments to transmit signals representing the operating conditions of the wave signal receivers, and second means at the receiver attachments responsive to the other of the outputs from the detecting means for controlling the receiver attachments to transmit signals representing testing operations.

References Cited in the file of this patent

UNITED STATES PATENTS

| | | |
|---|---|---|
| 2,576,617 | Loughren | Nov. 27, 1951 |
| 2,674,512 | Bogert et al. | Apr. 6, 1954 |
| 2,788,392 | Krahulec | Apr. 9, 1957 |
| 2,791,734 | Kieffert | May 7, 1957 |
| 2,795,775 | De Faymoreau | June 11, 1957 |
| 2,833,859 | Ramel et al. | May 6, 1958 |
| 2,852,726 | Ocnaschek | Sept. 16, 1958 |
| 2,923,771 | Avery et al. | Feb. 2, 1960 |
| 2,929,921 | Clark | Mar. 22, 1960 |
| 2,935,731 | Richter | May 3, 1960 |
| 2,941,120 | Harman et al. | June 14, 1960 |
| 2,957,046 | Freeman et al. | Oct. 18, 1960 |